United States Patent Office 3,449,295
Patented June 10, 1969

3,449,295
HIGH MOLECULAR WEIGHT LINEAR COPOLY-
ESTERS OF BISPHENOLS AND MIXTURES OF
ORTHO-PHTHALIC AND ISO- AND/OR TER-
EPHTHALIC ACIDS
Andre Jan Conix, Antwerp, Belgium, assignor to Gevaert
Photo-Producten N.V., Mortsel, Belgium, a Belgian
company
No Drawing. Continuation-in-part of application Ser. No.
103,227, Apr. 17, 1961. This application Sept. 30, 1966,
Ser. No. 583,423
Claims priority, application Great Britain, Apr. 21, 1960,
14,097/60
Int. Cl. C08g 17/08
U.S. Cl. 260—47
2 Claims

ABSTRACT OF THE DISCLOSURE

High molecular weight linear copolyesters of bisphenols and mixtures of orthophthalic and iso- and/or terephthalic acids having an intrinsic viscosity of at least 0.4 and good mechanical properties.

---

The invention relates to linear bisphenolcopolyesters, to products formed therefrom, and especially to films and molded or extruded objects prepared from critical compositions of certain polyester-forming components; this application being a continuation-in-part of application Ser. No. 103,227, filed Apr. 17, 1961, now abondoned. More particularly this invention relates to films and like shaped structures prepared from such copolyesters, having a high pliability, a high folding endurance and a high elongation at break.

Although it has long been known from United States Patent 2,035,578 of E. I. du Pont de Nemours & Co., (Inc.), filed Apr. 1, 1933, that polyesters can be prepared from diphenols such as 2,2-bis(4-hydroxyphenyl)propane (hereinafter called Bisphenol A), and dibasic acid chlorides such as o-phthaloyl chloride, it is generally accepted that the polycondensation of ortho-phthaloylchloride with Bisphenol A only yields low molecular weight and very brittle resins. These resins can only be used as lacquers and coating layers and cannot be formed into self-supporting films. However, in view of the easy availability and low cost of ortho-phthaloyl chloride, it would be highly desirable to obtain films with much improved properties from o-phthaloyl chloride.

Further it is known from the French patent specification No. 1,177,517 of Chemische Werke Albert, priority date in W. Germany of Nov. 21, 1956, that by effecting the polycondensation in a common solvent for the ortho-phthaloyl chloride and the polyester to be formed and in the presence as a catalyst of a quaternary ammonium compound, much higher molecular weight poly-bisphenol-ortho phthalates are obtained. From these poly-bisphenol-ortho phthalates self-supporting films can be cast which, however, are extremely brittle and hence cannot be folded without rupture. The process of said French patent specification No. 1,177,517 also described the preparation of copolyesters from a mixture of orthophthaloyl chloride and adipyl chloride with Bisphenol A. However, these copolyesters show much lower softening points, than the pure poly-bisphenol-ortho phthalate.

We have now found new copolyesters having very high molecular weights and possessing very special properties which are derived from the reaction of 2,2-bis(4-hydroxyphenyl)propane or its derivatives with mixtures of orthophthalic, isophthalic and/or terephthalic acids or their derivatives.

By the expression high molecular weight is meant a molecular weight sufficiently high as to show intrinsic viscosities of the polyester at least equal to 0.4 dl./g. when measured in solution of sym.-tetrachloroethane at 25° C.

Although it was already known to polymerize isophthalic or terephthalic acid with bisphenols, it could not be foreseen that by copolycondensation of the mixture of ortho- and iso- and/or terephthalic acid with Bisphenol A polyesters with much better properties are obtained than those of poly (Bisphenol A/isophthalate) or of poly (Bisphenol A/terephthalate) or of poly (Bisphenol A/orthophthalate).

In this respect we can refer to Example 7 of the complete specification in our British patent application Nos. 13,441/57, 35,430/57, filed Apr. 26, 1957 and Nov. 13, 1957, from which it appears that high molecular weight poly (Bisphenol A/isophthalate) is only soluable in relatively high boiling solvents such as sym. tetrachlorethane (B.P. 146° C.).

The solubility of poly (Bisphenol A/terephthalate) is still worse since it is only sparing soluble in sym.-tetrachloroethane.

The extreme difficulty encountered in evaporating the solvent, makes casting of films from these high boiling solvents very expensive. Furthermore, it is found that poly (Bisphenol A/isophthalate) and poly (Bisphenol A. terephthalate) relatively show a high crystallization rate. Consequently, the solvent cast films tend to be more or less opaque and brittle.

The new copolyesters according to the present invention possess the most desirable properties of the poly (Bisphenol A/isophthalate) or -terephthalate or -orthophthalate homopolymers such as low water-absorption and high softening temperature, but also have additional valuable valuable properties such as better solubility in low boiling solvents and particular an improved elongation at break.

Thus, the present polymer can be envisioned as being derived, as regards the acid component, from dicarboxylic acid consisting essentially of orthophthalic acid and at least a minor amount of terephthalic and/or isophthalic acid, the amount of said terephthalic and/or isophthalic acid being sufficient to produce a polymer which has an increased molecular weight and improved physical properties compared to a similarly prepared homopolyester or orthophthalic acid alone. Preferably, the amount of said terephthalic and/or isophthalic acid is such that the copolyester does not show brittle fracture when cast in film form and has a molecular weight corresponding to an intrinsic viscosity in excess of about 0.60.

The copolyesters of my invention are characterized by the presence in the polymeric chain of Bisphenol A-orthophthalate recurring units A together with Bisphenol A-isophthalate units B, and/or Bisphenol A-terephthalate units C of the following structures:

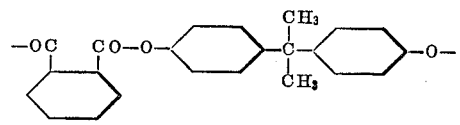

Type A

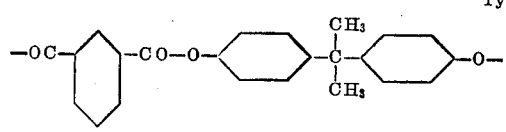

Type B

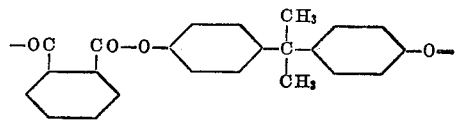

Type C

According to an important but optional feature of my invention high-molecular weight copolyesters are provided wherein the molar ratio of repeating units of Type A and Type B and/or Type C is between the limits 45:55 and 65:35. It is found that such polyesters possess unexpected mechanical properties, in particular an elongation at break higher than 10% when measured on an Instron dynamometer under the circumstances described below.

The copolyesters according to the invention can be prepared by the same general techniques as are employed in the preparation of other linear polyesters. According to a first method they can be manufactured by transesterification in the molten state and under reduced pressure of mixtures of Bisphenol A with phenyl esters of orthophthalic and isophthalic and/or terephthalic acid, whereby phenol is eliminated. A more convenient and even preferred method of manufacturing is found by polycondensing at about room temperature and in the presence of a catalyst, an alkali diphenate of Bisphenol A dissolved in water with mixtures of ortho-phthaloylchloride and iso-phthaloylchloride and/or terephthaloylchloride dissolved in a water immiscible inert common solvent or swelling agent for the acid chlorides and the copolyester to be formed. This general procedure for the preparation of polyarylphthalates is, e.g., described in the following publications: A. Conix, Ind. Chim. Belge, 22, 1457 (1957); A. Conix, Ind. Eng. Chem., 51, 147 (1959).

Preferred common solvents or swelling agents for the diacid chlorides and the copolyester to be formed are chlorinated aliphatic hydrocarbons such as methylene chloride, chloroform, 1,2-dichlorethane, 1,1,2-trichlorethane, sym.-tetrachloroethane, methylchloroform, dichloroethylene, etc.

Other water-immiscible organic solvents such as benzene, toluene, etc., can be used in combination with the above mentioned organic solvents.

As catalyst can be used onium compounds, such as quaternary ammonium, phosphonium or arsonium compounds or tertiary sulphonium compounds. They are added before or during the polycondensation reaction, preferably in amounts ranging from 0.1 to 5% on the amount of Bisphenol A. The best catalysts dissolve in the aqueous as well as in the organic phase; they can be added either before, during or after mixing both phases.

The diacid chlorides and the bisphenates are preferably reacted in stoichiometric quantities, i.e., one mole diacid chloride vs. one mole of bisphenate. However, exact obedience to stoichiometric proportions is not absolutely necessary for obtaining high molecular weight copolyesters. Deviations up to 10% from the equimolecular proportions can be easily tolerated.

In the preparation of copolyesters according to the invention the ortho-phthaloyl chloride can be partly replaced by phosgene and thiophosgene; by aliphatic, cycloaliphatic or aromatic dicarboxylic or disulphonic acid chlorides or by bischloroformates of dihydroxy compounds, without substantially altering the properties of the copolyeters. Also, Bisphenol A can be partly replaced by other diphenols such as, e.g., resorcine, hydroquinone, bis(4 - hydroxyphenyl)ether, bis(4 - hydroxyphenyl)sulphone. Finally Bisphenol A can be replaced wholly or in part by other dihydroxy-diphenyl-alkanes such as 2,2-bis-(4-hydroxyphenyl)butane and 1,1-bis(4-hydroxyphenyl) cyclohexane. These variants do not susbtantially alter the properties of the copolyesters and are consequently also within the scope of my invention.

The copolyesters of my invention are soluble in volatile solvents such as methylene chloride, 1,2-dichloroethane, chloroform, tetrahydrofurane, cyclohexanone and can be cast from solution into colourless, transparent and flexible films, the properties of which are described fully in the text below.

Alternatively, the copolyesters can be shaped in virtue of their thermoplastic properties into articles by the usual techniques such as compression-moulding, injection-moulding, extrusion or vacuum-forming. The shaped articles are characterized by high dimensional stability and good impact strength.

The unusual and unexpected properties of films cast from the copolymers of my invention are illustrated by the properties listed in the following table.

In the Table 1:

Column 1 indicates the molar ratio of repeating units of Bisphenol A/orthophthalate (A) type to Bisphenol A/isophthalate (B) type in the copolyester.

Column 2 refers to the preparation procedure described in the examples given hereinafter.

Column 3 gives the intrinsic viscosity of the copolyester measured as a solution in sym-tetrachloroethane at 25° C. The different copolyesters described in the table have been prepared from the same batches of orthophthaloylchloride resp. isophthaloylchloride. It is clearly seen that under identical preparative circumstances much higher molecular weights are obtained when using mixtures of the acid chlorides in lieu of pure ortho- or isophthaloylchloride.

Column 4 gives the softening range of the copolyester films. The softening temperature is determined by measuring the elongation of film strips subjected to a load of 0.17 kg./mm.$^2$ in function of temperature. The temperature range where an appreciable rise in elongation is observed is taken as the softening range. This range is indicative of the temperature up to which articles made of the copolyesters are dimensionally stable.

Column 5 lists the tenacity or tensile strength of the film. This property is determined by elongating the film at the rate of 10% per minute until rupture of the sample. The dimensions of the sample are: thickness: 50μ; width: 5 mm.; length between clamps: 50 mm.; temperature: 23.5° C.; relative humidity 50%. The measurements were carried out on a dynamometer known as an Instron tester.

Column 6 lists the yield strength determined under the the same circumstances as described for Column 5. In case no value is listed, this means that the sample breaks before the theoretical yield strength is reached. This behavior is characteristic of brittle failure.

TABLE 1

| 1 Molar proportion A:B (ortho:iso) | 2 Preparation: See example | 3 Intrinsic viscosity [η] dl./g. | 4 Shortening range, °C. | 5 Tensile strength (kg./mm.$^2$) | 6 Yield strength (kg./mm.$^2$) | 7 Elongation at break (percent) | 8 Solubility in methylene chloride | 9 Remarks |
|---|---|---|---|---|---|---|---|---|
| 0:100 | (1) | 0.5 | 135-190 | 7.0 | 6.5 | 5-20 | Insoluble | Crystallizes opaque film. |
| 20:80 | 9 | 0.56 | 130-160 | 6.3 | | 4 | do | Idem. |
| 30:70 | 8 | 0.64 | 130-160 | 6.7 | | 5 | Partially soluble | |
| 40:60 | 7 | 0.70 | 140-150 | 7.1 | | 6 | Soluble | Cloudy solutions. |
| 50:50 | 6 | 0.90 | 140-157 | 7.0 | 7.7 | 40 | do | Exhibits "colddrawing." |
| 60:40 | 5 | 1.04 | 140-150 | 7.1 | 7.2 | 10 | do | Do. |
| 70:30 | (1) | 0.9 | 130-145 | 6.6 | | 7 | do | Brittle films. |
| 80:20 | 3 | 0.8 | 130-145 | 6.6 | | 5 | do | Do. |
| 90:10 | 2 | 0.6 | 130-150 | 6.6 | | 4 | do | Do. |
| 100:0 | 1 | 0.6 | 125-150 | 5.1 | | 3 | do | Extremely brittle films. |

[1] Prepared according to the procedure described in my French Patent Specification 1,195,311, priority dates in Great Britain of December 14, 1956, April 2 and 26, 1957 and November 13, 1957.

Column 7 gives the elongation at break of the film sample. It is clearly seen that the samples 50:50 and 60:40 show a much improved elongation at break. These samples also show the phenomenon of "cold drawing." This phenomenon is characteristics for polymers having a high impact strength. Both of these film samples possess a very high folding endurance (flex life) in contrast to the other samples listed in the table.

In the same way tercopolymers can be manufactured from the reaction of mixtures of ortho-, iso- and terephthalic acids with Bisphenol A. For their manufacture the same procedures were followed as described in the Examples 2 to 9 of the present invention but instead of mixtures of different ratios of ortho- and isophthalic acids, we are now starting from mixtures of different ratios of ortho-, iso and terephthalic acids. The properties of films cast from these copolyesters are listed in the table above.

In the table 2:

Column 1 molar ratio of repeating units of Bisphenol A/orthophthalate A type to Bisphenol A/isophthalate B type to Bisphenol A/terephthalate C type in the copolyester.

Columns 2–8 have the same legend as the corresponding columns of Table 1.

As already stated above, colorless, transparent and flexible films can be manufactured from the copolyesters of the present invention. Due to these properties and to those listed in the preceding tables, some combinations of recurring units are very well suited for the manufacture of films intended to be used as a support in a photographic film element, as a support for magnetic recording tape, in the packaging field, as supports for adhesive tapes, and for electrical insulating tapes.

The films can be stretched biaxially in the same ratio or in different ratios whereby the tensile properties are markedly improved. These copolymers can also be used as protective layers in photographic materials because of their low water absorption and low water permeability.

The invention is illustrated but not limited by the following examples. The intrinsic viscosity values $[\eta]$ were measured in sym.-tetrachloroethane at 25° C.

TABLE 2

| 1 | 2 | 3 | 4 | 5 | 6 | 7 | 8 | |
|---|---|---|---|---|---|---|---|---|
| Molar Proportion A:B:C | Intrinsic viscosity $[\eta]$ dl./g. | Softening range ° C. | Tensile Strength (kg./mm.$^2$) | Yield Strength (kg./mm.$^2$) | Elongation (percent) | Solubility in methylene chloride | Remarks | |
| 100:0:0 | 0.6 | 125–150 | 5.1 | | 3 | Soluble | Extremely brittle films. | |
| 50:25:25 | 0.6 | 151–156 | 6.5 | 7.2 | 20 | do | Exhibits "cold drawing." | |
| 33:33:33 | 0.6 | 160–170 | 6.1 | 6.7 | 25 | do | Idem. | |
| 15:15:70 | 1.5 | 165–180 | 6.4 | 6.3 | 25 | do | Do. | |
| 0:100:0 | 0.5 | 135–190 | 7.0 | 6.5 | 5–20 | Insoluble | Crystallizes film opaque. | |
| 0:0:100 | 0.6 | 220–270 | 7.2 | 7.4 | 5–20 | do | Crystallizes very easily, films opaque. | |

EXAMPLE 1

9.12 g. Bisphenol A (0.04 mole), 81.5 cm.$^3$ of 0.9905 N sodium hydroxide, 0.5 g. of triethylbenzyl-ammoniumchloride and 10 cm.$^3$ of methylene chloride are successively brought into a three-necked 250 cm.$^3$ flask, provided with a stirrer and a dropping funnel. While stirring and at 0° C., a solution of 5.8 cm.$^3$ of phthaloylchloride (0.04 mole) in 15 cm.$^3$ of methylene chloride is dropwise added through the dropping funnel within 10 minutes. After the addition of the acid chloride solution, the reaction mixture is stirred at room temperature for another 50 minutes whereby the polymer separates as a viscous mass. The supernatant aqueous layer is decanted and the residue washed two times with 50 cm.$^3$ of water, while strongly stirring, whereafter the polymer solution is diluted with 50 cm.$^3$ of methylene chloride. The polymer is isolated by pouring out the polymer solution into methanol, and drying the precipitate at 100° C. $[\eta]=0.60$ dl./g.

EXAMPLE 2

9.12 g. of Bisphenol A (0.04 mole), 81.5 cm.$^3$ of 0.9905 N sodium hydroxide, 0.4 g. of triethylbenzylammoniumchloride and 10 cm.$^3$ of methylene chloride are successively brought into a three-necked 250 cm.$^3$ flask, provided with a stirrer and a dropping funnel. While stirring and at 0° C., a solution of 0.812 g. of isophthaloylchloride (0.004 mole) and 5.22 cm.$^3$ of phthaloylchloride (0.035 mole) into 15 cm.$^3$ of methylene chloride is dropwise added through the dropping funnel within 10 minutes. After the addition of the acid chloride solution, the reaction mixture is stirred at room temperature for another 2 hours, whereby the polymer separates as a viscous mass. The supernatant aqueous layer is decanted and the residue washed two times with 50 cm.$^3$ of water, while strongly stirring, whereafter the polymer solution is diluted with 50 cm.$^3$ of methylene chloride. The polymer is isolated by pouring out the polymer solution into methanol, and drying the precipitate at 150° C. $[\eta]=0.60$ dl./g.

EXAMPLE 3

9.12 g. of Bisphenol A (0.04 mole), 81.5 cm.$^3$ of 0.9905 N sodium hydroxide, 0.4 g. of triethylbenzylammoniumchloride and 10 cm.$^3$ of methylene chloride are successively brought into a three-necked 250 cm.$^3$ flask, provided with a stirrer and a dropping funnel. While stirring and at 0° C., a solution of 1.624 g. of isophthaloylchloride (0.008 mole) and 4.64 cm.$^3$ of phthaloyl chloride (0.032 mole) in 15 cm.$^3$ of methylene chloride is dropwise added through the dropping funnel within 10 minutes. After the addition of the acid chloride solution, the reaction mixture is stirred at room temperature for another 2 hours, whereby the polymer separates as a viscous mass. The supernatant aqueous layer is decanted and the residue washed two times with 50 cm.$^3$ of water, while strongly stirring, whereafter the polymer solution is diluted with 50 cm.$^3$ of methylene chloride. The polymer is isolated by pouring out the polymer solution into methanol, and drying the precipitate at 100° C. $[\eta]=0.84$ dl./g.

EXAMPLE 4

9.12 g. of Bisphenol A (0.04 mole), 81.5 cm.$^3$ of 0.9905 N sodium hydroxide, 0.4 g. of triethylbenzylammoniumchloride and 10 cm.$^3$ of methylene chloride are successively brought into a three-necked 250 cm.$^3$ flask, provided with a stirrer and a dropping funnel. While stirring and at 0° C., a solution of 2.436 g. of isophthaloylchloride (0.012 mole) and 4.06 cm.$^3$ of phthaloylchloride (0.028 mole) in 15 cm.$^3$ of methylene chloride, is dropwise added through the dropping funnel within 10 minutes. After the addition of the acid chloride solution, the reaction mixture is stirred at room temperature for another 2 hours, whereby the polymer separates as a viscous mass. The supernatant aqueous layer is decanted, and the residue washed two times with 50 cm.$^3$ of water, while strongly stirring, whereafter the polymer layer is diluted with 50 cm.$^3$ of methylene chloride. The polymer is isolated by pouring out the polymer solution into methanol, and drying the precipitate at 100° C. $[\eta]=0.90$ dl./g.

EXAMPLE 5

9.12 g. of Bisphenol A (0.04 mole), 81.5 cm.$^3$ of 0.9905 N sodium hydroxide, 0.4 g. of triethylbenzylammoniumchloride and 10 cm.$^3$ of methylene chloride, are successively brought into a three-necked 250 cm.$^3$ flask, provided with a stirrer and a dropping funnel. While stirring and at 0° C., a solution of 3.248 g. of isophthaloylchloride (0.016 mole) and 3.48 cm.$^3$ of phthaloylchloride (0.024 mole) in 15 cm.$^3$ of methylene chloride are dropwise added through the dropping funnel within 10 minutes. After the addition of the acid chloride solution, the reaction mixture is stirred at room temperature for another 2 hours, whereby the polymer separates as a viscous mass. The supernatant aqueous layer is decanted, and the residue washed two times with 50 cm.$^3$ of water, while strongly stirring, whereafter the polymer solution is diluted with 50 cm.$^3$ of methylene chloride. The polymer is isolated by pouring out the polymer solution into methanol, and drying the precipitate at 100° C. $[\eta] = 1.04$ dl./g.

EXAMPLE 6

9.12 g. of Bisphenol A (0.04 mole), 84 cm.$^3$ of 0.963 N sodium hydroxide, 0.4 g. of triethylbenzylammoniumchloride and 10 cm.$^3$ of methylene chloride are successively brought into a three-necked 250 cm.$^3$ flask provided with a stirrer, a thermometer and a dropping funnel. While stirring and at 18–20° C., a solution of 4.06 g. of isophthaloylchloride (0.02 mole) and 2.9 cm.$^3$ of phthaloylchloride (0.02 mole) in 15 cm.$^3$ of methylene chloride is dropwise added through the dropping funnel within 15 minutes. After the addition of the acid chloride solution, the reaction mixture is stirred at room temperature for another 2 hours whereby the polymer separates as a viscous mass. The supernatant aqueous layer is decanted, and the residue washed two times with 50 cm.$^3$ of water, while strongly stirring, whereafter, the polymer layer is diluted with 50 cm.$^3$ of methylene chloride. The polymer is isolated by pouring out the polymer solution into methanol, and drying the precipitate at 100° C. $[\eta] = 0.90$ dl./g.

EXAMPLE 7

9.12 g. of Bisphenol A (0.04 mole), 81.5 cm.$^3$ of 0.9905 N sodium hydroxide, 0.4 g. of triethylbenzylammoniumchloride and 10 cm.$^3$ of methylene chloride are successively brought into a three-necked 250 cm.$^3$ flask, provided with a stirrer and a dropping funnel. While stirring and at 0° C., a solution of 4.872 g. of isophthaloylchloride (0.024 mole) and 2.32 cm.$^3$ of phthaloylchloride (0.016) in 15 cm.$^3$ of methylene chloride, is dropwise added through the dropping funnel within 10 minutes. After the addition of the acid chloride solution, the reaction mixture is stirred at room temperature for another 1 hour, whereby the polymer separates as a viscous mass. The supernatant aqueous layer is decanted and the residue washed two times with 50 cm.$^3$ of water, while strongly stirring, whereafter the polymer layer is diluted with 50 cm.$^3$ of methylene chloride. The polymer is isolated by pouring out the polymer solution into methanol, and drying the precipitate at 100° C. $[\eta] = 0.70$ dl./g.

EXAMPLE 8

9.12 g. Bisphenol A (0.04 mole), 81.5 cm.$^3$ of 0.9905 N sodium hydroxide, 0.4 g. of triethylbenzylammonium chloride and 10 cm.$^3$ of methylene chloride, are successively brought into a three-necked 250 cm.$^3$ flask, provided with a stirrer and a dropping funnel. While stirring and at 0° C., a solution of 5.684 g. of isophthaloylchloride (0.028 mole) and 1.74 cm.$^3$ of phthaloylchloride (0.012 mole) in 15 cm.$^3$ of methylene chloride, is dropwise added through the dropping funnel within 10 minutes. After the addition of the acid chloride solution, the reaction mixture is stirred at room temperature for another 1 hour, whereby the polymer separates as a viscous mass. The supernatant aqueous layer is decanted and the residue washed two times with 50 cm.$^3$ of water, while thoroughly stirring. The polymer is isolated by pouring out the viscous mass into ethanol, and drying the precipitate at 100° C. This polymer is practically insoluble in methylene chloride, but dissolves in hot 1,1,2-trichloroethane and in sym.-tetrachloroethane at room temperature. $[\eta] = 0.064$ dl./g.

EXAMPLE 9

9.12 g. of Bisphenol A (0.04 mole), 81.5 cm.$^3$ of 0.9905 N sodium hydroxide, 0.4 g. of triethylbenzylammoniumchloride, and 10 cm.$^3$ of methylene chloride are successively brought into a three-necked 250 cm.$^3$ flask, provided with a stirrer and a dropping funnel. While stirring and at 0° C., a solution of 6.496 g. of isophthaloylchloride (0.033 mole) and 1.16 cm.$^3$ of phthaloylchloride (0.008 mole) in 5 cm.$^3$ of methylene chloride, is dropwise added through the dropping funnel within 10 minutes. After the addition of the acid chloride solution, the reaction mixture is stirred at room temperature for another 1 hour, whereby the polymer separates as a swelled viscous mass. The supernatant aqueous layer is decanted and the residue washed two times with 50 cm.$^3$ of water, while strongly stirring. The polymer is isolated by pouring out the swelled mass into ethanol while stirring, and drying the precipitate at 100° C. This polymer is insoluble in methylene chloride, but dissolves in sym.-tetrachloroethane. $[\eta] = 0.56$ dl./g.

EXAMPLE 10

3.42 g. of Bisphenol A (0.015 mole), 160 g. of 3-pentadecylrescorcine (0.008 mole), 41 cm.$^3$ of 0.9905 N sodium hydroxide, 0.2 g. of triethylbenzylammoniumchloride and 10 cm.$^3$ of methylene chloride, are successively brought into a three-necked 250 cm.$^3$ flask, provided with a stirrer and a dropping funnel. While stirring at room temperature, a solution of 2.03 g. of isophthaloylchloride (0.01 mole) and 1.45 cm.$^3$ of phthaloylchloride (0.01 mole) in 20 cm.$^3$ of methylene chloride, is dropwise added through the dropping funnel within 10 minutes. After the addition of the acid chloride solution, the reaction mixture is stirred for another 2 hours, whereby an emulsion is obtained. The reaction mixture is washed two times with 100 cm.$^3$ of water, while strongly stirring and poured out in methanol. The precipitate is dried at 100° C. $[\eta] = 0.9$ dl./g. A film cast from a methylene chloride solution is cold-drawable and shows a softening temperature of 120° C.

EXAMPLE 11

4.55 g. of Bisphenol A (0.02 mole), 48.3 cm.$^3$ of NaOH solution 0.891 N, 0.2 g. of triethylbenzylammoniumchloride and 10 cm.$^3$ of methylene chloride are successively brought in to a three-necked 250 cm.$^3$ flask, provided with a stirrer and a dropping funnel. While stirring and at room temperature, a solution of 2.03 g. of terephthaloylchloride (0.01 mole) and 1.45 cm.$^3$ of phthaloylchloride (0.01 mole) in 10 cm.$^3$ of methylene chloride is dropwise added through the dropping funnel within 20 minutes. After the addition of the acid chloride solution, the reaction mixture is stirred at room temperature for another 2 hours whereby the polymer separates as a viscous mass. The supernatant water is decanted and the residue washed two times with 50 cm.$^3$ of water, while strongly stirring, whereafter the polymer layer is diluted with 50 cm.$^3$ of methylene chloride. The product is obtained by pouring out the polymer solution into methanol, and drying the precipitate at 100° C. $[\eta] = 0.80$ dl./g. A film cast from a methylene chloride solution shows a softening temperature of 155° C., and has the following mechanical properties:

Modulus of elasticity .................... kg./mm.² ... 214
Tensile strength ......................... do .... 6.7
Yield strength ........................... do .... 7.3
Elongation at break ...................... percent .. 70

EXAMPLE 12

6.84 g. of Bisphenol A (0.03 mole), 68 cm.³ of 0.9905 N sodium hydroxide, 0.1 g. of triethylbenzylammoniumchloride and 15 cm.³ of methylene chloride are brought into a three-necked 250 cm.³ flask provided with a stirrer and a dropping funnel. While stirring and at room temperature a solution of 2.03 g. of terephthaloylchloride (0.01 mole), 2.03 g. of isophthaloylchloride (0.01 mole) and 1.45 cm.³ of phthaloylchloride (0.01 mole) dissolved in 15 cm.³ of methylene chloride is dropwise added through the dropping funnel within 15 minutes. After the addition of the acid chloride solution, the reaction mixture is stirred at room temperature for another 120 minutes. The supernatant aqueous layer is decanted and the residue washed two times with 50 cm.³ of water, while strongly stirring whereafter the polymer solution is diluted with 50 cm.³ of methylene chloride. The polymer is isolated by pouring out the polymer solution into methanol and drying the precipitate at 100° C. [η]=0.9 dl./g. A film cast from a methylene chloride solution is cold drawable and shows an elongation at break of 40%.

EXAMPLE 13

3.42 g. of Bisphenol A (0.015 mole), 1.60 g. of 3-pentadecylresorcine (0.005 mole), 41 cm.³ of 0.9905 N sodium hydroxide, 0.2 g. of triethylbenzylammoniumchloride and 10 cm.³ of methylene chloride, are successively brought into a three-necked 250 cm.³ flask, provided with a stirrer and a dropping funnel. While stirring at room temperature, a solution of 2.03 g. of isophthaloylchloride (0.01 mole) and 1.45 cm.³ of phthaloylchloride (0.01 mole) into 20 cm.³ of mehylene chloride, is dropwise added through the dropping funnel within 10 minutes. After the addition of the acid chloride solution, the reaction mixture is stirred for another 2 hours, whereby an emulsion is obtained. The reaction mixture is washed two times with 100 cm.³ of water, while stirring strongly and the reaction mixture is poured out in methanol. The precipitate is dried at 100° C. [η]=0.90 dl./g. A film cast from a methylene chloride solution is cold-drawable and shows a softening temperature of 120° C. The elongation at break was found to be 20%.

I claim:
1. A high molecular weight thermoplastic linear copolyester, having an intrinsic viscosity of at least about 0.4 measured in a solution of a sym.-tetrachloroethane at 25° C., of 2,2-bis(4-hydroxyphenyl)alkane and dicarboxylic acid, said dicarboxylic acid consisting of about 45–65 mol percent of orthophthalic acid, and the balance of said dicarboxylic acid is at least one modifying acid from the group consisting of isophthalic acid and terephthalic acid.

2. A copolyester as in claim 1 having an intrinsic viscosity greater than about 0.6.

References Cited

UNITED STATES PATENTS

| 3,133,898 | 5/1964 | Keck. | |
|---|---|---|---|
| 2,035,578 | 3/1936 | Wagner | 260—47 |
| 2,595,343 | 5/1952 | Drewitt et al. | 260—47 |
| 2,727,882 | 5/1955 | Vodonik | 260—75 |
| 2,854,434 | 9/1958 | Beaman. | |
| 3,028,364 | 4/1962 | Conix et al. | |
| 3,036,992 | 5/1962 | Holub et al. | |
| 3,138,898 | 5/1964 | Keck. | |
| 3,160,602 | 12/1964 | Kantor et al. | |

FOREIGN PATENTS 902,021 7/1962 Great Britain.

OTHER REFERENCES

Conix, Industrial and Engineering Chemistry, vol. 51, No. 2, February 1959, pp. 147–150.

Public Inspection Notice of Abstract of Australian Application 63,231/60, Aug. 4, 1960, Open to Public Inspection Feb. 9, 1961.

WILLIAM H. SHORT, *Primary Examiner.*

L. P. QUAST, *Assistant Examiner.*

U.S. Cl. X.R.

96—87; 260—33.8